US012355602B2

(12) United States Patent
Karjalainen et al.

(10) Patent No.: US 12,355,602 B2
(45) Date of Patent: Jul. 8, 2025

(54) COMPENSATION OF RESIDUAL TIME-FREQUENCY ERRORS IN COMMUNICATIONS

(71) Applicant: Nokia Technologies Oy, Espoo (FI)

(72) Inventors: Juha Karjalainen, Oulu (FI); Sami-Jukka Hakola, Oulu (FI); Esa Tiirola, Oulu (FI); Jorma Kaikkonen, Oulu (FI); Karol Schober, Espoo (FI); Timo Koskela, Oulu (FI); Mihai Enescu, Espoo (FI); Kari Pajukoski, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/247,856

(22) PCT Filed: Sep. 17, 2021

(86) PCT No.: PCT/EP2021/075612
§ 371 (c)(1),
(2) Date: Apr. 4, 2023

(87) PCT Pub. No.: WO2022/078709
PCT Pub. Date: Apr. 21, 2022

(65) Prior Publication Data
US 2023/0388168 A1    Nov. 30, 2023

(30) Foreign Application Priority Data
Oct. 15, 2020  (EP) .................................... 20201909

(51) Int. Cl.
*H04L 27/26*   (2006.01)
*H04L 5/00*    (2006.01)

(52) U.S. Cl.
CPC ...... *H04L 27/2613* (2013.01); *H04L 27/2675* (2013.01); *H04L 5/0051* (2013.01)

(58) Field of Classification Search
CPC  H04L 27/2613; H04L 27/2675; H04L 5/0051
See application file for complete search history.

(56) References Cited

U.S. PATENT DOCUMENTS 10,470,191 B2    11/2019   Si et al.
2018/0227848 A1*  8/2018   Lee ................... H04W 52/0216
(Continued)

FOREIGN PATENT DOCUMENTS

CN   107547187 A   1/2018
CN   109150472 A   1/2019
(Continued)

OTHER PUBLICATIONS

"New SID: Study on supporting NR from 52.6GHz to 71 GHz", 3GPP TSG RAN Meeting #86, RP-193259, Agenda: 9.1.1, Intel Corporation, Dec. 9-12, 2019, 3 pages.
(Continued)

*Primary Examiner* — Jaison Joseph
(74) *Attorney, Agent, or Firm* — Nokia Technologies Oy

(57) ABSTRACT

Devices, methods and computer programs for compensation of residual time-frequency error(s) in communications between a network node device and a client device are disclosed. A network node device determines an auxiliary reference signal indication comprising presence information and location information of an auxiliary reference signal in a physical downlink channel transmission. The network node device transmits to the client device the auxiliary reference signal associated with a physical downlink channel in accordance with the determined auxiliary reference signal indication. The client device uses the received auxiliary reference signal for the compensation of the residual time-frequency error(s) in the communications.

10 Claims, 6 Drawing Sheets

(56) References Cited

U.S. PATENT DOCUMENTS

| | | | |
|---|---|---|---|
| 2019/0356444 A1 | 11/2019 | Noh et al. | |
| 2020/0287678 A1* | 9/2020 | Li | H04W 72/23 |
| 2022/0110148 A1 | 4/2022 | Oh et al. | |
| 2023/0388168 A1* | 11/2023 | Karjalainen | H04L 27/2675 |

FOREIGN PATENT DOCUMENTS

| | | |
|---|---|---|
| JP | 2020-505876 A | 2/2020 |
| WO | 2019/029711 A1 | 2/2019 |

OTHER PUBLICATIONS

"3rd Generation Partnership Project; Technical Specification Group Radio Access Network; NR; Physical layer procedures for data (Release 16)", 3GPP TS 38.214, V16.2.0, Jun. 2020, pp. 1-163.

"3rd Generation Partnership Project; Technical Specification Group Radio Access Network; NR; Physical layer procedures for control (Release 16)", 3GPP TS 38.213, V16.2.0, Jun. 2020, pp. 1-176.

"New WID: Further enhancements on MIMO for NR", 3GPP TSG RAN Meeting #86, RP-193133, Agenda: 9.1.1, Samsung, Dec. 9-12, 2019, 5 pages.

"Discussion on fine time/frequency tracking RS design", 3GPP TSG RAN WG1 Meeting #88, R1-1702346, Agenda: 8.1.2.4.6, ETRI, Feb. 13-17, 2017, pp. 1-5.

"Summary for TRS/CSI-RS occasion(s) for idle/inactive UEs", 3GPP TSG RAN WG1 #102-e, R1-200xxxx, Agenda: 8.7.1.2, Samsung, Aug. 17-28, 2020, pp. 1-10.

Extended European Search Report received for corresponding European Patent Application No. 20201909.7, dated Mar. 17, 2021, 11 pages.

"Summary for TRS/CSI-RS occasion(s) for idle/inactive UEs", 3GPP TSG RAN WG1 #102-e, R1-2007475, Agenda: 8.7.1.2, Samsung, Aug. 17-28, 2020, 17 pages.

International Search Report and Written Opinion received for corresponding Patent Cooperation Treaty Application No. PCT/EP2021/075612, dated Dec. 23, 2021, 14 pages.

Office Action for Indian Application No. 202347033004 dated Jun. 3, 2024 and English translation.

Office Communication for European Application No. 20 201 909.7 dated Apr. 19, 2024.

Samsung, TRS/CSI-RS for idle/inactive UEs, 3GPP TSG RAN WG1 #102-e R1-2006158, Aug. 7, 2020, <URL: https://www.3gpp.org/ftp/tsg_ran/WG1_RL1/TSGR1_102-e/Docs/R1-2006158.zip><R1-2006158 On TRSCSI-RS occasion(s)for idleinactive UEs.docx>.

Office Action for Japanese Application No. 2023-522977 dated May 28, 2024 and English translation.

"Beam Management Aspects", 3GPP TSG RAN WG1 #104, R1-210026, Agenda: 8.2.4, Nokia, Jan. 25-Feb. 5, 2021, 7 pages.

"3rd Generation Partnership Project; Technical Specification Group Radio Access Network; NR; User Equipment (UE) procedures in Idle mode and RRC Inactive state (Release 17)", 3GPP TS 38.304 V17.10.0, Dec. 2024, pp. 1-53.

"3rd Generation Partnership Project; Technical Specification Group Radio Access Network; NR; Radio Resource Control (RRC) protocol specification (Release 17)", 3GPP TS 38.331 V17.12.0, Mar. 2025, pp. 1-1355.

"3rd Generation Partnership Project; Technical Specification Group Radio Access Network; NR; Multiplexing and channel coding (Release 17)", 3GPP TS 38.212, V17.10.0, Dec. 2024, pp. 1-204.

Office action received for corresponding Chinese Patent Application No. 202180080896.7, dated May 28, 2025, 9 pages of office action and 6 pages of translation available.

* cited by examiner

COMPENSATION OF RESIDUAL TIME-FREQUENCY ERRORS IN COMMUNICATIONS

RELATED APPLICATION

This application claims priority to PCT Application No. PCT/EP2021/075612, filed on Sep. 17, 2021, which claims priority to EP Application No. 20201909.7 filed on Oct. 15, 2020, each of which is incorporated herein by reference in its entirety.

BACKGROUND

In cellular communication networks, time synchronization is needed for a user equipment (UE) to access the network and establish a data communication link with a base station. In fifth generation (5G) new radio (NR) wireless networks, the need for accurate time and frequency synchronization is further increased because waveform and multiple access techniques are based on orthogonal frequency-division multiplexing (OFDM). Without time and frequency synchronization, a received signal would be severely degraded due to e.g. inter-block interference (IBI) and inter-carrier interference (ICI).

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a network node device comprises means for performing: determining an auxiliary reference signal indication comprising presence and location information of an auxiliary reference signal in a physical downlink channel transmission, the auxiliary reference signal to be used for compensation of one or more residual time-frequency errors in communications between the network node device and a client device; and causing the network node device to transmit the auxiliary reference signal associated with a physical downlink channel in accordance with the determined auxiliary reference signal indication to the client device.

In an example embodiment, alternatively or in addition to the above-described example embodiments, the means are further configured to perform causing the network node device to transmit the determined auxiliary reference signal indication to the client device prior to transmitting the auxiliary reference signal associated with the physical downlink channel.

In an example embodiment, alternatively or in addition to the above-described example embodiments, the presence and location information comprises at least one of: an explicit presence and/or location indication for inclusion in a master information block carried by a physical broadcast channel, the explicit presence and/or location indication indicating a multiplexing and/or occurrence pattern for the auxiliary reference signal; or an implicit presence and/or location indication for inclusion in the master information block carried by the physical broadcast channel, the implicit presence and/or location indication comprising derivation information for deriving the presence and/or location of the auxiliary reference signal of the physical downlink channel transmission.

In an example embodiment, alternatively or in addition to the above-described example embodiments, the auxiliary reference signal comprises at least one of: a demodulation reference signal of a control resource set #0 associated with at least one location of a common search space TYPE0; or a first orthogonal frequency-division multiplexing symbol of a physical downlink shared channel carrying a system information block #1, or one or more resources of the auxiliary reference signal are repeated over K consecutive symbols after a configured or reserved beam switching symbol, or a first symbol reserved for a type 0 physical downlink control channel, or repeated after L symbols over K consecutive or non-consecutive symbols of the configured or reserved beam switching symbol or a first symbol reserved for the type 0 physical downlink control channel or a first symbol reserved for a physical downlink shared channel carrying a system information block #1 or a first symbol reserved for a demodulation reference signal of the physical downlink shared channel carrying the system information block #1.

In an example embodiment, alternatively or in addition to the above-described example embodiments, the means are further configured to perform: determining a type of the demodulation reference signal of the control resource set #0 from the auxiliary reference signal indication.

In an example embodiment, alternatively or in addition to the above-described example embodiments, the location information comprises frequency/time location information or symbol/physical resource block location information.

In an example embodiment, alternatively or in addition to the above-described example embodiments, the means comprises at least one processor and at least one memory including computer program code. The at least one memory and computer program code are configured to, with the at least one processor, cause the performance of the network node device.

An example embodiment of a method comprises: determining, by a network node device, an auxiliary reference signal indication comprising presence and location information of an auxiliary reference signal in a physical downlink channel transmission, the auxiliary reference signal to be used for compensation of one or more residual time-frequency errors in communications between the network node device and a client device; and transmitting, by the network node device, the auxiliary reference signal associated with a physical downlink channel in accordance with the determined auxiliary reference signal indication to the client device.

In an example embodiment, alternatively or in addition to the above-described example embodiments, the method further comprises transmitting, by the network node device, the determined auxiliary reference signal indication to the client device prior to transmitting the auxiliary reference signal associated with the physical downlink channel.

In an example embodiment, alternatively or in addition to the above-described example embodiments, the presence and location information comprises at least one of: an explicit presence and/or location indication for inclusion in a master information block carried by a physical broadcast channel, the explicit presence and/or location indication indicating a multiplexing and/or occurrence pattern for the auxiliary reference signal; or an implicit presence and/or location indication for inclusion in the master information block carried by the physical broadcast channel, the implicit presence and/or location indication comprising derivation information for deriving the presence and/or location of the auxiliary reference signal of the physical downlink channel transmission.

In an example embodiment, alternatively or in addition to the above-described example embodiments, the auxiliary reference signal comprises at least one of: a demodulation reference signal of a control resource set #0 associated with at least one location of a common search space TYPE0; or a first orthogonal frequency-division multiplexing symbol of a physical downlink shared channel carrying a system information block #1, or one or more resources of the auxiliary reference signal are repeated over K consecutive symbols after a configured or reserved beam switching symbol or a first symbol reserved for a type 0 physical downlink control channel, or repeated after L symbols over K consecutive or non-consecutive symbols of the configured or reserved beam switching symbol or a first symbol reserved for the type 0 physical downlink control channel or a first symbol reserved for a physical downlink shared channel carrying a system information block #1 or a first symbol reserved for a demodulation reference signal of the physical downlink shared channel carrying the system information block #1.

In an example embodiment, alternatively or in addition to the above-described example embodiments, the method further comprises determining a type of the demodulation reference signal of the control resource set #0 from the auxiliary reference signal indication.

In an example embodiment, alternatively or in addition to the above-described example embodiments, the location information comprises frequency/time location information or symbol/physical resource block location information.

An example embodiment of a computer program comprises instructions for causing a network node device to perform at least the following: determining an auxiliary reference signal indication comprising presence and location information of an auxiliary reference signal in a physical downlink channel transmission, the auxiliary reference signal to be used for compensation of one or more residual time-frequency errors in communications between the network node device and a client device; and transmitting the auxiliary reference signal associated with a physical downlink channel in accordance with the determined auxiliary reference signal indication to the client device.

An example embodiment of a network node device comprises at least one processor and at least one memory including computer program code. The at least one memory and the computer program code are configured to, with the at least one processor, cause the network node device at least to perform: determining an auxiliary reference signal indication comprising presence and location information of an auxiliary reference signal in a physical downlink channel transmission, the auxiliary reference signal to be used for compensation of one or more residual time-frequency errors in communications between the network node device and a client device; and transmitting the auxiliary reference signal associated with a physical downlink channel in accordance with the determined auxiliary reference signal indication to the client device.

An example embodiment of a client device comprises means for performing: causing the client device to receive from a network node device an auxiliary reference signal associated with a physical downlink channel in accordance with an auxiliary reference signal indication, the auxiliary reference signal indication comprising presence and location information of the auxiliary reference signal in the physical downlink channel transmission; and using the received auxiliary reference signal for compensation of one or more residual time-frequency errors in communications between the client device and the network node device.

In an example embodiment, alternatively or in addition to the above-described example embodiments, the means are further configured to perform causing the client device to receive from the network node device the auxiliary reference signal indication prior to receiving the auxiliary reference signal associated with the physical downlink channel.

In an example embodiment, alternatively or in addition to the above-described example embodiments, the means are further configured to perform determining, based on the presence and location information in the received auxiliary reference signal indication, the presence and location of the auxiliary reference signal in a subsequent physical downlink channel transmission.

In an example embodiment, alternatively or in addition to the above-described example embodiments, the presence and location information comprises at least one of: an explicit presence and/or location indication included in a master information block carried by a physical broadcast channel, the explicit presence and/or location indication indicating a multiplexing and/or occurrence pattern for the auxiliary reference signal; or an implicit presence and/or location indication included in the master information block carried by the physical broadcast channel, the implicit presence and/or location indication comprising derivation information for deriving the presence and/or location of the auxiliary reference signal of the physical downlink channel transmission.

In an example embodiment, alternatively or in addition to the above-described example embodiments, the auxiliary reference signal comprises at least one of: a demodulation reference signal of a control resource set #0 associated with at least one location of a common search space TYPE0; or a first orthogonal frequency-division multiplexing symbol of a physical downlink shared channel carrying a system information block #1, or one or more resources of the auxiliary reference signal are repeated over K consecutive symbols after a configured or reserved beam switching symbol or a first symbol reserved for a type 0 physical downlink control channel, or repeated after L symbols over K consecutive or non-consecutive symbols of the configured or reserved beam switching symbol or a first symbol reserved for the type 0 physical downlink control channel or a first symbol reserved for a physical downlink shared channel carrying a system information block #1 or a first symbol reserved for a demodulation reference signal of the physical downlink shared channel carrying the system information block #1.

In an example embodiment, alternatively or in addition to the above-described example embodiments, the means are further configured to perform: determining a type of the demodulation reference signal of the control resource set #0 from the auxiliary reference signal indication.

In an example embodiment, alternatively or in addition to the above-described example embodiments, the location information comprises frequency/time location information or symbol/physical resource block location information.

In an example embodiment, alternatively or in addition to the above-described example embodiments, the means are further configured to perform determining the presence information based on a subcarrier spacing ratio between a synchronization signal block and the control resource set #0.

In an example embodiment, alternatively or in addition to the above-described example embodiments, the means comprises at least one processor and at least one memory including computer program code. The at least one memory and computer program code are configured to, with the at least one processor, cause the performance of the client device.

An example embodiment of a method comprises: receiving, at a client device from a network node device, an auxiliary reference signal associated with a physical downlink channel in accordance with an auxiliary reference signal indication, the auxiliary reference signal indication comprising presence and location information of the auxiliary reference signal in the physical downlink channel transmission; and using, by the client device, the received auxiliary reference signal for compensation of one or more residual time-frequency errors in communications between the client device and the network node device.

In an example embodiment, alternatively or in addition to the above-described example embodiments, the method further comprises receiving at the client device from the network node device the auxiliary reference signal indication prior to receiving the auxiliary reference signal associated with the physical downlink channel.

In an example embodiment, alternatively or in addition to the above-described example embodiments, the method further comprises determining by the client device, based on the presence and location information in the received auxiliary reference signal indication, the presence and location of the auxiliary reference signal in a subsequent physical downlink channel transmission.

In an example embodiment, alternatively or in addition to the above-described example embodiments, the presence and location information comprises at least one of: an explicit presence and/or location indication included in a master information block carried by a physical broadcast channel, the explicit presence and/or location indication indicating a multiplexing and/or occurrence pattern for the auxiliary reference signal; or an implicit presence and/or location indication included in the master information block carried by the physical broadcast channel, the implicit presence and/or location indication comprising derivation information for deriving the presence and/or location of the auxiliary reference signal of the physical downlink channel transmission.

In an example embodiment, alternatively or in addition to the above-described example embodiments, the auxiliary reference signal comprises at least one of: a demodulation reference signal of a control resource set #0 associated with at least one location of a common search space TYPE0; or a first orthogonal frequency-division multiplexing symbol of a physical downlink shared channel carrying a system information block #1, or one or more resources of the auxiliary reference signal are repeated over K consecutive symbols after a configured or reserved beam switching symbol or a first symbol reserved for a type 0 physical downlink control channel, or repeated after L symbols over K consecutive or non-consecutive symbols of the configured or reserved beam switching symbol or a first symbol reserved for the type 0 physical downlink control channel or a first symbol reserved for a physical downlink shared channel carrying a system information block #1 or a first symbol reserved for a demodulation reference signal of the physical downlink shared channel carrying the system information block #1.

In an example embodiment, alternatively or in addition to the above-described example embodiments, the method further comprises determining a type of the demodulation reference signal of the control resource set #0 from the auxiliary reference signal indication.

In an example embodiment, alternatively or in addition to the above-described example embodiments, the location information comprises frequency/time location information or symbol/physical resource block location information.

In an example embodiment, alternatively or in addition to the above-described example embodiments, the method further comprises determining the presence information based on a subcarrier spacing ratio between a synchronization signal block and the control resource set #0.

An example embodiment of a computer program comprises instructions for causing a client device to perform at least the following: receiving from a network node device an auxiliary reference signal associated with a physical downlink channel in accordance with an auxiliary reference signal indication, the auxiliary reference signal indication comprising presence and location information of the auxiliary reference signal in the physical downlink channel transmission; and using the received auxiliary reference signal for compensation of one or more residual time-frequency errors in communications between the client device and the network node device.

An example embodiment of a client device comprises at least one processor and at least one memory including computer program code. The at least one memory and the computer program code are configured to, with the at least one processor, cause the client device at least to perform: receiving from a network node device an auxiliary reference signal associated with a physical downlink channel in accordance with an auxiliary reference signal indication, the auxiliary reference signal indication comprising presence and location information of the auxiliary reference signal in the physical downlink channel transmission; and using the received auxiliary reference signal for compensation of one or more residual time-frequency errors in communications between the client device and the network node device.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
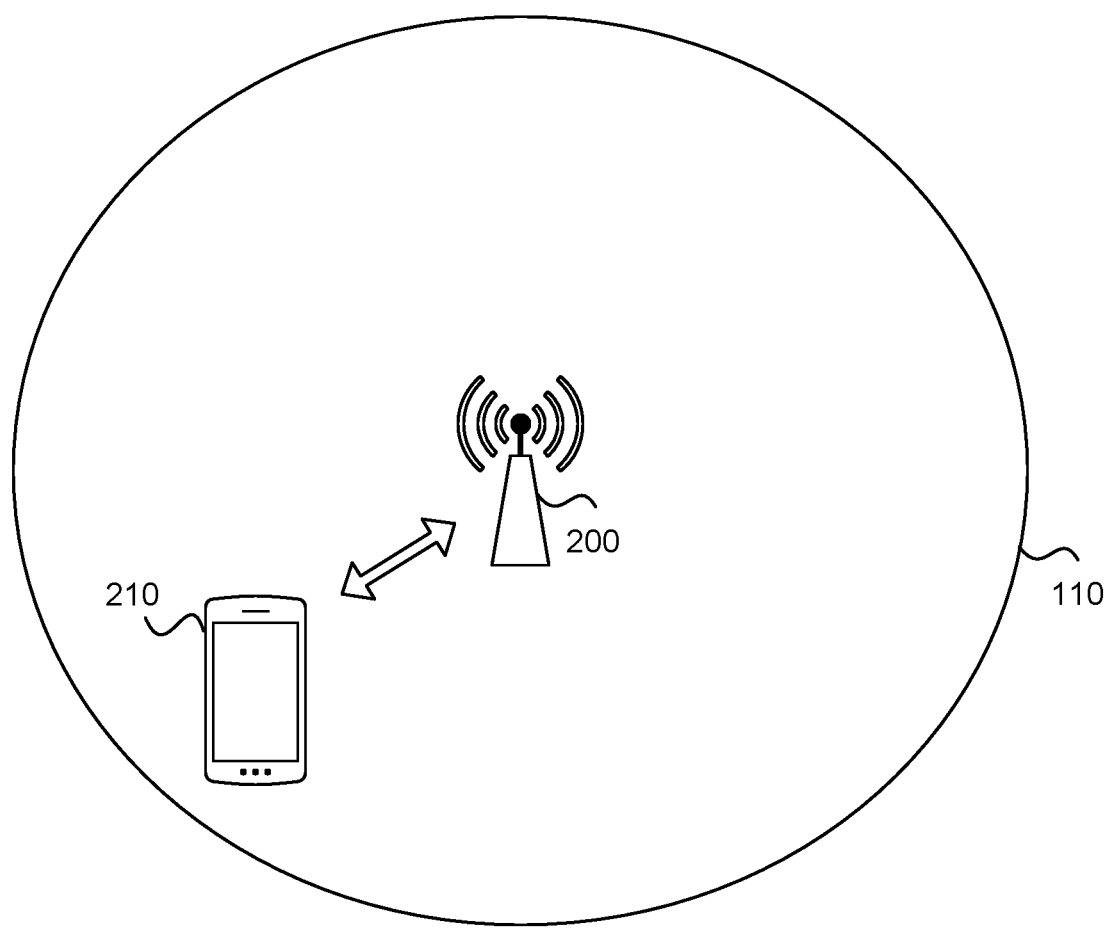
FIG. 1 shows an example embodiment of the subject matter described herein illustrating an example system, where various embodiments of the present disclosure may be implemented.

FIG. 1 illustrates an example system 100, where various embodiments of the present disclosure may be implemented. The system 100 may comprise a fifth generation (5G) new radio (NR) network 110. An example representation of the system 100 is shown depicting a network node device 200 and a client device 210. At least in some embodiments, the 5G NR network 110 may utilize high carrier frequencies, e.g. millimeter wave (mmWave) bands, in at least some of the communications between the network node device 200 and the client device 210. At least in some embodiments, the mmWave bands may comprise a carrier frequency range of 52.6 gigahertz (GHz) and above. At least in some embodiments, the mmWave bands may comprise a carrier frequency range of 52.6 GHz to 71 GHz. In at least some embodiments, the mmWave bands may be utilized e.g. for industrial private networks, time sensitive networks, high accuracy positioning, environmental sensing (such as radar applications), and/or audiovisual interaction (such as wireless augmented reality applications).

The client device 210 may include e.g. a mobile phone, a smartphone, a tablet computer, a smart watch, or any handheld or portable device or a device for sidelink communication. The client device 210 may also be referred to as a user equipment (UE). The network node device 200 may be a base station. The base station may include e.g. a fifth-generation base station (gNB) or any such device suitable for providing an air interface for client devices to connect to a wireless network via wireless transmissions.

In the following, various example embodiments will be discussed. At least some of these example embodiments allow residual timing error compensation for network deployments with high carrier frequencies, e.g. above 52.6 GHz. In such situations, a subcarrier spacing associated with a synchronization signal block (SSB) GHz transmission may be smaller compared with a control resource set #0 (CORESET #0)/physical downlink shared channel (PDSCH)/physical uplink shared channel (PUSCH). The objective may be achieved by means of an auxiliary reference signal that may be associated with the SSB transmission.

Figure 2A:
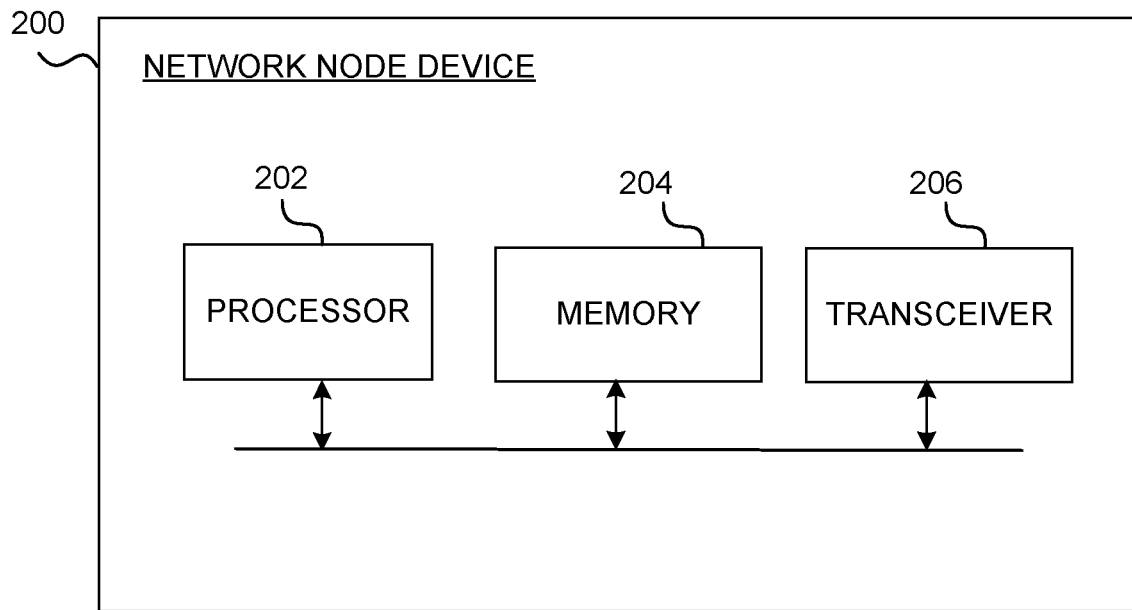
FIG. 2A shows an example embodiment of the subject matter described herein illustrating a network node device.

FIG. 2A is a block diagram of a network node device 200, in accordance with an example embodiment.

The network node device 200 comprises means 202, 204 for causing the performance of the network node device 200. The means 202, 204 may comprise one or more processors 202 and one or more memories 204 that comprise computer program code. The at least one memory 204 and computer program code may be configured to, with the at least one processor 202, cause the performance of the network node device 200. The network node device 200 may also include other elements, such as a transceiver 206.

Although the network node device 200 is depicted to include only one processor 202, the network node device 200 may include more processors. In an embodiment, the memory 204 is capable of storing instructions, such as an operating system and/or various applications. Furthermore, the memory 204 may include a storage that may be used to store e.g. at least some of the information and data used in the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hardcoded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and nonvolatile memory devices. For example, the memory 204 may be embodied as semiconductor memories (such as mask ROM, PROM (programmable ROM), EPROM (erasable PROM), flash ROM, RAM (random access memory), etc.).

The network node device 200 may be a base station. The base station may include e.g. a fifth-generation base station (gNB) or any such device providing an air interface for client devices to connect to the wireless network via wireless transmissions.

The means 202, 204 are configured to perform determining an auxiliary reference signal indication. The auxiliary reference signal indication comprises presence and location (e.g. in time and/or frequency and/or multiplexing) information of an auxiliary reference signal in a physical downlink channel transmission, such as a physical downlink control channel (PDCCH) transmission or a physical downlink shared channel (PDSCH) transmission. The auxiliary reference signal is to be used for compensation of one or more residual time-frequency errors in communications between the network node device 200 and the client device 210. Herein, the term "time-frequency error" refers to a time domain error and/or a frequency domain error. At least in some embodiments, the location information may comprise frequency/time location information or symbol/physical resource block (PRB) location information. This may allow the client device 210 to be aware of a frequency domain location of the auxiliary reference signal (i.e. a PRB allocation for CORESET #0).

In other words, to enable the UE 210 to compensate for residual timing error(s), an auxiliary reference signal is introduced to an SSB and/or MIB transmission. The signal is present when a triggering condition is satisfied. The network node device 200 may transmit an SSB or MIB with triggering condition information (i.e. the auxiliary reference signal indication and its presence and location information) to the UE 210. The triggering condition information allows the UE 210 to determine whether the auxiliary reference signal (RS) will be available in the PDCCH/PDSCH. Furthermore, the triggering condition information allows the UE 210 to determine a location of the auxiliary RS. The auxiliary reference signal may be used by the UE 210 to detect and/or compensate for residual time-frequency errors at higher carrier frequencies (such as above 52.6 GHz) for downlink and/or uplink transmissions. As will be discussed in more detail below, the UE 210 receives the MIB and the triggering condition information from the network node device 200, and the UE 210 determines whether a triggering condition is satisfied based on the MIB and the triggering condition information. The network node device 200 transmits a PDCCH/PDSCH to the UE 210 with the auxiliary RS in the specified location of the PDCCH/PDSCH. If the triggering condition is satisfied, the UE 210 identifies the auxiliary RS within the PDCCH/PDSCH at this location.

For example, the presence and location information may comprise an explicit presence and/or location indication. The explicit presence and/or location indication is to be included in a master information block (MIB) carried by a physical broadcast channel (PBCH). The explicit presence and/or location indication indicates a multiplexing and/or occurrence pattern for the auxiliary reference signal.

In other words, the triggering condition may be indicated via an explicit indication as a part of MIB (in PBCH). For example, a signal/RS multiplexing and occurrence pattern may be explicitly provided or indicated as a part of the MIB. The MIB size may be kept unchanged. The explicit indication maybe implemented e.g. by providing it in a spare bit, or by reducing the configurability of a current MIB and borrowing/repurposing that reduced bit for the explicit indication.

Alternatively or additionally, the presence and location information may comprise an implicit presence and/or location indication. The implicit presence and/or location indication is to be included in the MIB carried by the PBCH. The implicit presence and/or location indication comprises derivation information for deriving the presence and/or location of the auxiliary reference signal of the physical downlink channel (e.g. the PDCCH and/or PDSCH) transmission.

In other words, the triggering condition may be indicated via an implicit indication. For example, the triggering condition may be derived based on a ratio of numerologies between the SSB and the CORESET #0 indicated by the MIB: if the ratio satisfies a threshold and if the carrier frequency is above 52.6 GHz, then the UE 210 may determine that an auxiliary RS presence in the PDCCH/PDSCHH will be guaranteed by the network node 200. Otherwise, the UE 210 may determine that the auxiliary RS presence in PDCCH and/or PDSCH is not guaranteed. For example, based on information on subcarrier spacing (SCS) for the CORESET #0 provided in MIB, the UE 210 may determine a decision value $K=SCS_{CORESET\ \#}0/SCS_{SSB}$. If both conditions $K \geq 2$ and carrier frequency>52.6 GHz are valid, then the UE 210 may determine that the auxiliary reference signal is present and available for residual timing error compensation. Otherwise, the UE 210 may determine that the auxiliary reference signal presence is not guaranteed.

Alternatively or additionally, the triggering condition may be indicated e.g. using a dedicated signaling to the UE 210 regarding a suitable target frequency band or range.

Alternatively or additionally, the triggering condition may be derived based on other criteria, such as pre-designation of e.g. every second SSB location in frequency as an "auxiliary RS will be present" inference and the remaining locations as "auxiliary signal RS will not be present" inferences.

For example, the auxiliary reference signal may comprise a demodulation reference signal of a control resource set #0 associated with at least one location of a common search space TYPE0. In other words, an "always on" Type0-PDCCH DMRS related to CORESET #0 may be used as the auxiliary RS, in which case the UE 210 may assume that Type0-PDCCH DMRS is present when the triggering condition is satisfied. In at least some embodiments, a wideband DMRS may become a property of the CORESET when triggering conditions are met. The "always on" may result in the UE 210 being in this case able to determine that the CORESET #0 DMRS is transmitted even without control data.

A Type 0 PDCCH common search space is a subset of a NR PDCCH search space that may be dedicated to transmitting the PDCCH for system information (SI) message (system information block, SIB) decoding.

Herein, the DMRS being "always on" may comprise at least one of the following:
 it relates to PDCCH monitoring occasions determined by Type 0 PDCCH common search space;
 the number of antenna ports equals 1;
 the precoding granularity is determined according to contiguous PRBs of the CORESET #0;
 the precoding granularity is determined based on MIB;
 the DMRS type is "narrowband"; or
 the DMRS type is "wideband".

The precoder granularity-parameter may relate to a precoder cycling-based transmit diversity scheme (1-port) where gNB may be able to change the phasing of the Tx antennas/beams according to a predefined PRB and OFDM symbol grid. Precoder granularity in frequency defines the PRBs where an UE can assume phase continuity, and precoder granularity in time defines the OFDM symbols where the UE can assume phase continuity respectively. The UE may assume that consecutive OFDM symbols of the CORESET are transmitted with the same precoder. In other words, precoder granularity in time may correspond to the number of OFDM symbols of the CORESET. Precoder granularity in frequency may be a configuration parameter, or it may be derived implicitly from another DMRS property. An example of implicit signaling is to define that when wideband DMRS has been configured, the precoding granularity in frequency is determined according to contiguous PRBs of the CORESET.

Alternatively/additionally, the auxiliary reference signal may comprise a first orthogonal frequency-division multiplexing (OFDM) symbol of a PDSCH carrying a system information block #1 (SIB1). In other words, the auxiliary RS or a time-frequency tracking reference signal (TRS) may be included in the first OFDM symbol of the PDSCH carrying the SIB1.

Alternatively/additionally, one or more resources of the auxiliary reference signal may be repeated over K consecutive symbols after a configured or reserved beam switching symbol or a first symbol reserved for a type 0 PDCCH, or repeated after L symbols over K consecutive or non-consecutive symbols of the configured or reserved beam switching symbol or a first symbol reserved for the type 0 PDCCH or a first symbol reserved for a PDSCH carrying a system information block #1 or a first symbol reserved for a DMRS of the PDSCH carrying the system information block #1.

In other words, the UE 210 may assume that the resource (s) of the auxiliary RS is/are repeated over K consecutive symbols after the configured/reserved beam switch symbol or the first symbol reserved for type 0 PDCCH, or that the resource(s) of the auxiliary RS is/are repeated after L symbols over K consecutive or non-consecutive symbols of configured or reserved beam switching symbol or the first symbol reserved for type 0 PDCCH, or the first symbol reserved for physical downlink shared channel carrying a system information block #1, or the first symbol reserved for DMRS of physical downlink shared channel carrying a system information block #1. Alternatively, when no control information is multiplexed with the auxiliary RS, the UE 210 may determine that the resources of the auxiliary RS are power boosted with respect to the embodiment with the control information multiplexing.

The means 202, 204 may optionally be further configured to perform determining a type (i.e. narrowband or wideband) of the demodulation reference signal of the control resource set #0 from the auxiliary reference signal indication. In at least some embodiments, a wideband demodulation reference signal may correspond to a case in which the DMRS is transmitted via all the PRBs of the control resource set #0, while the narrowband demodulation reference signal may correspond to a case in which the DMRS is transmitted via PRBs containing downlink control information.

In at least some embodiments, bandwidth for the associated auxiliary RS may be at least 20 physical resource blocks (PRBs) according to $SCS_{CORESET}$. In some other embodiments, the bandwidth for the associated auxiliary RS may be equal to that of the CORESET #0, 24,48 or 96 PRBs, and the auxiliary RS may be present in all the symbols of the CORESET #0. In at least some embodiments, this may allow the auxiliary RS to be used for PDCCH demodulation with a low implementation complexity.

In at least some embodiments, time-division multiplexing (TDM) may be used between the auxiliary RS and the SSB. In at least some embodiments, this may maximize the SSB coverage. This may also result in the auxiliary RS being present with a subset of supported SSB multiplexing patterns, such as with patterns 1 of FIG. 5A and 2 of FIG. 5B.

The means 202, 204 are further configured to perform causing the network node device 210 to transmit to the client device 210 the auxiliary reference signal associated with a physical downlink channel (e.g. the PDCCH and/or PDSCH) in accordance with the determined auxiliary reference signal indication.

The means 202, 204 may optionally be further configured to perform causing the network node device 200 to transmit the determined auxiliary reference signal indication to the client device 210 prior to transmitting the auxiliary reference signal associated with the physical downlink channel (e.g. the PDCCH and/or PDSCH). In at least some embodiments, the auxiliary reference signal being associated with the physical downlink channel may comprise the auxiliary reference signal being associated with a CORESET #0 and/or a search space set. In at least some embodiments, this may mean that CORESET #0 may contain a wideband auxiliary reference signal that may be used for PDCCH demodulation purposes.

Figure 2B:
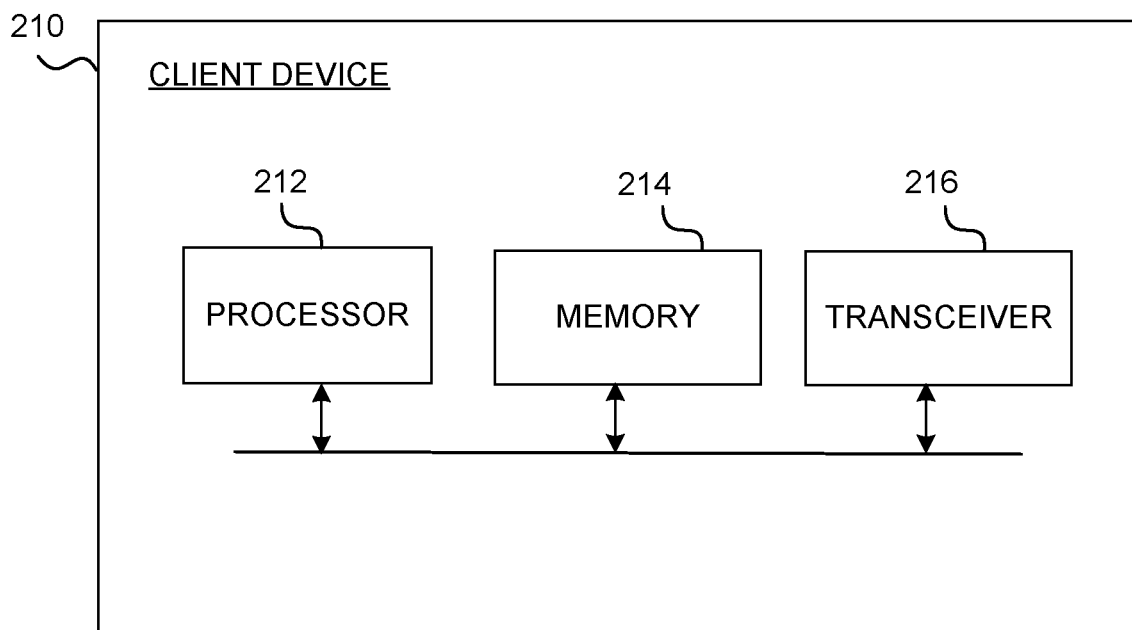
FIG. 2B shows an example embodiment of the subject matter described herein illustrating a client device.

FIG. 2B is a block diagram of the client device 210, in accordance with an example embodiment.

The client device 210 comprises means 212, 214 for causing the performance of the client device 210. The means 212, 214 may comprise one or more processors 212 and one or more memories 214 that comprise computer program code. The at least one memory 214 and computer program code may be configured to, with the at least one processor 212, cause the performance of the client device 210. The client device 210 may also include other elements, such as a transceiver 216.

Although the client device 210 is depicted to include only one processor 212, the client device 210 may include more processors. In an embodiment, the memory 214 is capable of storing instructions, such as an operating system and/or various applications. Furthermore, the memory 214 may include a storage that may be used to store e.g. at least some of the information and data used in the disclosed embodiments.

Furthermore, the processor 212 is capable of executing the stored instructions. In an embodiment, the processor 212 may be embodied as a multi-core processor, a single core processor, or a combination of one or more multi-core processors and one or more single core processors. For example, the processor 212 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 212 may be configured to execute hardcoded functionality. In an embodiment, the processor 212 is embodied as an executor of software instructions, wherein the instructions may specifically configure the processor 212 to perform the algorithms and/or operations described herein when the instructions are executed.

The memory 214 may be embodied as one or more volatile memory devices, one or more non-volatile memory devices, and/or a combination of one or more volatile memory devices and non-volatile memory devices. For example, the memory 214 may be embodied as semiconductor memories (such as mask ROM, PROM (programmable ROM), EPROM (erasable PROM), flash ROM, RAM (random access memory), etc.).

The client device 210 may be any of various types of devices used directly by an end user entity and capable of communication in a wireless network, such as user equipment (UE). Such devices include but are not limited to smartphones, tablet computers, smart watches, lap top computers, Internet-of-Things (IoT) devices, devices for sidelink communication, etc.

The means 212, 214 are configured to perform causing the client device 210 to receive from the network node device 200 the auxiliary reference signal associated with the physical downlink channel (e.g. the PDCCH and/or PDSCH) in accordance with the auxiliary reference signal indication. As discussed above, the auxiliary reference signal indication comprises the presence and location information of the auxiliary reference signal in the physical downlink channel (e.g. the PDCCH or PDSCH) transmission.

The means 212, 214 are further configured to perform using the received auxiliary reference signal for compensation of one or more residual time-frequency errors in communications between the client device 210 and the network node device 200. The means 212, 214 may optionally be further configured to perform causing the client device 210 to receive from the network node device 200 the auxiliary reference signal indication prior to receiving the auxiliary reference signal associated with a physical downlink channel (e.g. the PDCCH and/or PDSCH).

The means 212, 214 may optionally be further configured to perform determining, based on the presence and location information in the received auxiliary reference signal indication, the presence and location of the auxiliary reference signal in a subsequent physical downlink channel (e.g. the PDCCH or/and PDSCH) transmission.

The means 212, 214 may optionally be further configured to perform determining the presence information based on a subcarrier spacing (SCS) ratio between a synchronization signal block (SSB) and the control resource set #0 (CORESET #0).

Further features (such as those related to the auxiliary reference signal, the auxiliary reference signal indication, the presence and location information, the explicit presence and location indication, and the implicit presence and location indication) of the client device 210 directly result from the functionalities and parameters of the network node device 200 and thus are not repeated here.

Figure 3:
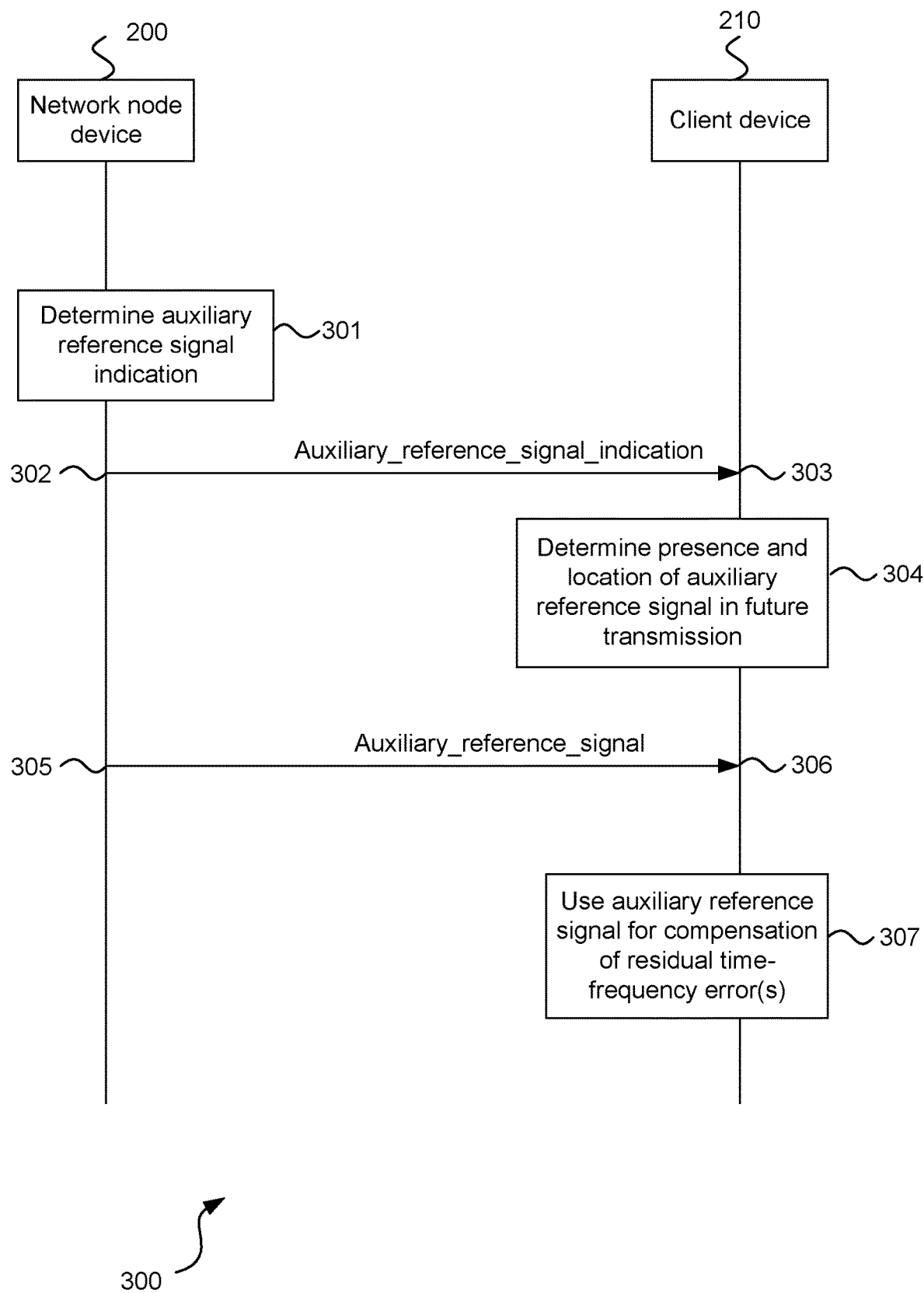
FIG. 3 shows an example embodiment of the subject matter described herein illustrating a method.

FIG. 3 illustrates an example signaling diagram of a method 300, in accordance with an example embodiment.

In operation 301, the network node device 200 determines the auxiliary reference signal indication comprising the presence information and location information of the auxiliary reference signal in the physical downlink channel (e.g. PDCCH and/or PDSCH) transmission. As discussed above, the auxiliary reference signal is to be used for compensation of one or more residual time-frequency errors in communications between the network node device 200 and the client device 210.

In optional operation 302, the network node device 200 transmits the determined auxiliary reference signal indication to the client device 210.

In optional operation 303, the client device 210 receives the auxiliary reference signal indication from the network node device 200.

In optional operation 304, the client device 210 determines, based on the presence and location information in the received auxiliary reference signal indication, the presence and location of the auxiliary reference signal in a subsequent physical downlink channel (e.g. PDCCH or/and PDSCH) transmission.

In operation 305, the network node device 200 transmits to the client device 210 the auxiliary reference signal associated with a physical downlink channel (e.g. the PDCCH and/or PDSCH) in accordance with the determined auxiliary reference signal indication.

In operation 306, the client device 210 receives from the network node device 200 the auxiliary reference signal associated with a physical downlink channel (e.g. the PDCCH and/or PDSCH) in accordance with the auxiliary reference signal indication. As discussed above, the auxiliary reference signal indication comprises the presence and location information of the auxiliary reference signal in the physical downlink channel (e.g. PDCCH and/or PDSCH) transmission.

In operation 307, the client device 210 uses the received auxiliary reference signal for compensation of one or more residual time-frequency errors in communications between the client device 210 and the network node device 200.

The method 300 may be performed by the network node device 200 of FIG. 2A and the client device 210 of FIG. 2B. The operations 301, 302, 305 can, for example, be performed by the at least one processor 202 and the at least one memory 204. The operations 303, 304, 306, 307 can, for example, be performed by the at least one processor 212 and the at least one memory 214. Further features of the method 300 directly result from the functionalities and parameters of the network node device 200 and the client device 210 and thus are not repeated here. The method 300 can be performed by computer program(s).

Figure 4:
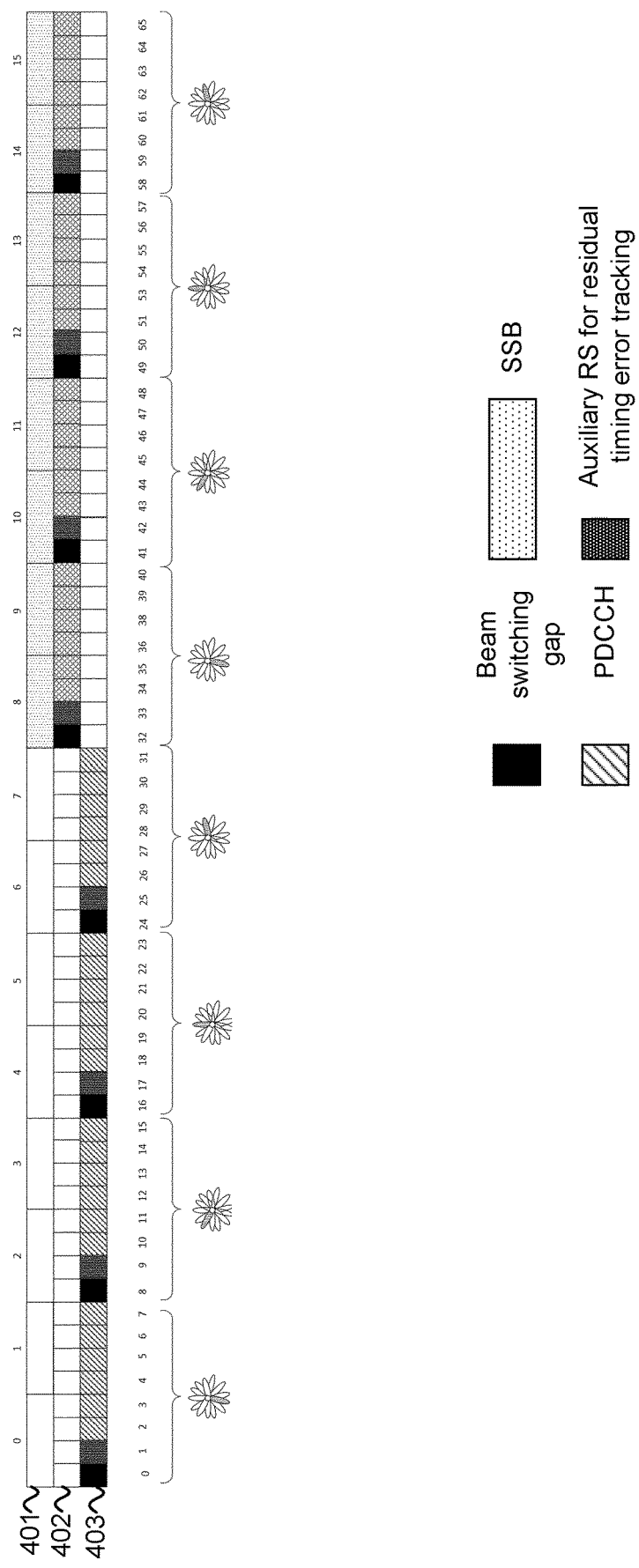
FIG. 4 shows an example embodiment of the subject matter described herein illustrating an extended multiplexing pattern.

FIG. 4 illustrates a diagram 400 of an example of an extended multiplexing pattern 2 for higher carrier frequencies (above 52.6 GHz) with a 240 kilohertz (kHz) numerology for the SSB and a 960 kHz CORESET and PDSCH in conjunction with the auxiliary RS for downlink (DL) and uplink (UL) residual timing estimation. In diagram 400, element 401 represents the SSB of 240 kHz, element 402 represents a PDSCH+RS of 960 kHz, and element 403 represent a PDCCH+RS of 960 kHz. As shown in FIG. 4, the multiplexing pattern 2 has been extended such that the coverage of the type0-PDCCH and PDSCH is the same as with the SSB (with SCS=240 kHz). This is done by introducing repetition of type0-PDCCH/PDSCH symbols with a factor of 4. Additionally, auxiliary "beam switching gap" symbols have been added into the beginning of every half-slot (marked with black in FIG. 4) to enable DL transmit (TX) beam switching without performance degradation with the 960 kHz numerology. The reason for this is that the length of a cyclic prefix with 960 kHz sub-carrier spacing may be too short in time compared to the time used for TX beam switching time, i.e. 100 ns.

Figure 5A:
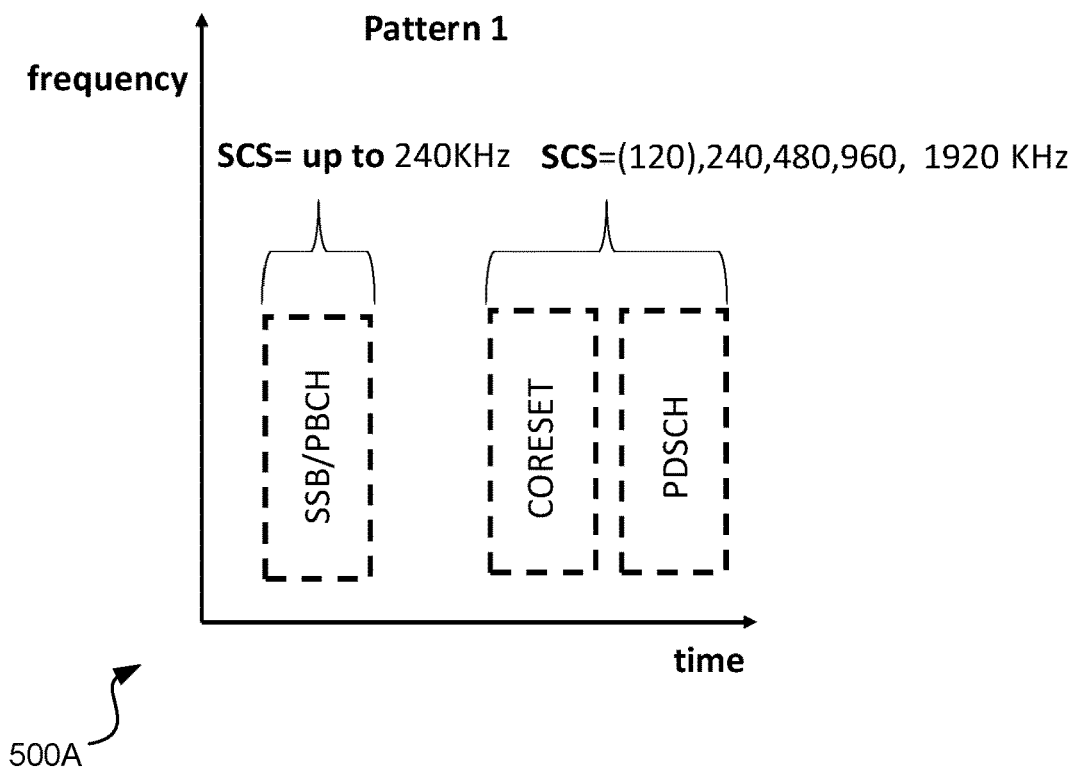
FIGS. 5A-5C show example embodiments of the subject matter described herein illustrating multiplexing patterns.
Figure 5B:
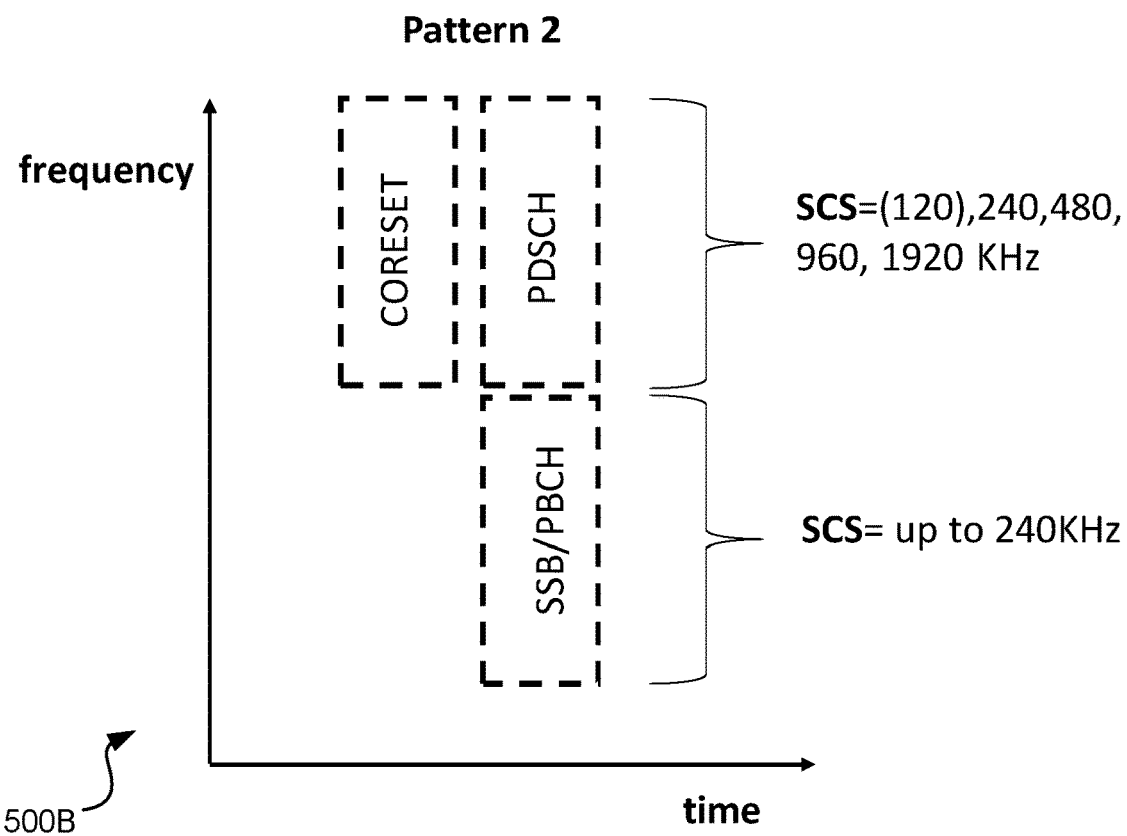
Figure 5C:
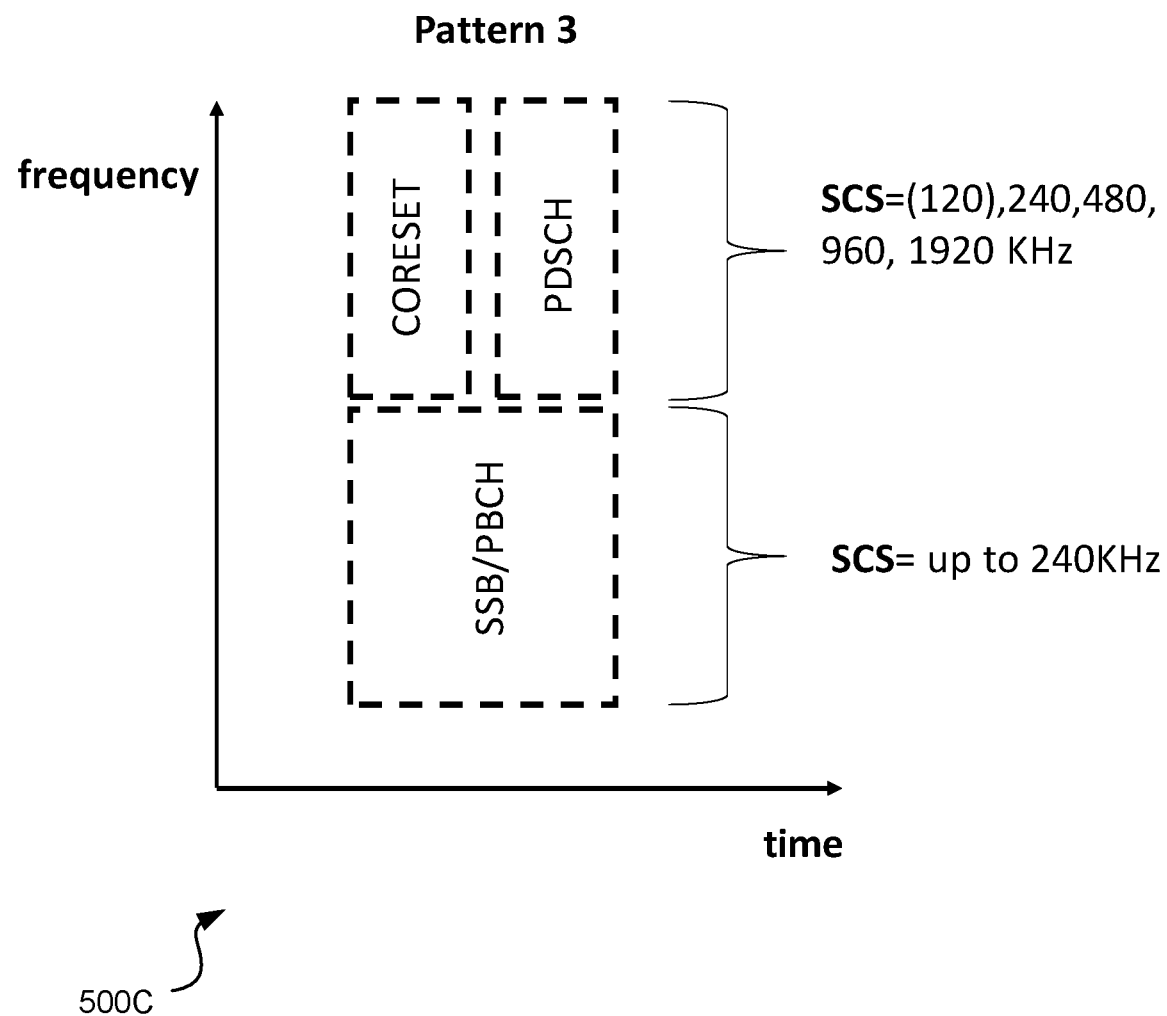

FIGS. 5A-5C illustrate examples of the multiplexing patterns 1 to 3. Diagram 500A of FIG. 5A represents an example of the multiplexing pattern 1, diagram 500B of FIG. 5B represents an example of the multiplexing pattern 2, and diagram 500C of FIG. 5C represents an example of the multiplexing pattern 3. Diagram 500A (pattern 1), diagram 500B and diagram 500C (pattern 2 and pattern 3, respectively) show time and frequency domain multiplexing options associated with different numerology options for e.g. 51-71 GHz.

During an initial access phase, there is no RRC connection available to configure the UE 210 with parametrization of auxiliary RSs/channels/signals. Therefore, without awareness of the configuration associated with the auxiliary RS, the UE 210 may not be able to utilize the presence of the auxiliary RS for a residual timing error compensation. One way to provide this information for the UE 210 is to configure the parameterization of the auxiliary RS explicitly or implicitly, as discussed above.

Regarding the implicit indication, an SCS (up to two different SCS candidates) associated with the SSB may be defined for certain carrier frequencies, and the PBCH may carry the SCS information for the CORESET #0. In case of multiple SCS candidates for the SSB, the UE 210 may make different hypotheses on the SSB with different SCSs. Otherwise, the UE 210 may be aware of the SCS associated with the carrier frequency. After determining the SCS for the SSB, the UE 210 may receive the SCS for the CORESET #0 as a part of the MIB via the PBCH. Then, based on this information, the UE 210 may determine the decision value $K = SCS_{CORESET\ \#0}/SCS_{SSB}$. When both conditions $K \geq 2$ and carrier frequency>52.6 GHZ are satisfied, the UE 210 may determine that the time position associated with the resources of the auxiliary RS is indicated with respect to the start symbol of CORESET #0 DL TX beam.

The time position may be defined as a time offset with respect to the start symbol of the CORESET #0, also taking into account a possibly configured beam switching gap symbol. The UE 210 may determine that a single-symbol auxiliary RS is a full replica of a DMRS of type0-PDCCH associated with a CORESET #0, in terms of configuration, such as sequence, sequence initialization, as well as time and frequency locations. Additionally, the UE 210 may determine that no control information is multiplexed into a same symbol, e.g. by energy detection or when the UE 210 does not detect any PDCCH. Since no control information is multiplexed into a symbol, the UE 210 may determine that the resource elements associated with the resource(s) of the auxiliary RS are power-boosted with respect to the control information multiplexing. Alternatively, the UE 210 may determine that the resource(s) of the auxiliary RS is/are repeated over K consecutive symbols after the configured/reserved beam switch symbol. The network node device 200 may overwrite the implicit indication by one auxiliary 1-bit payload as a part of the PBCH. This bit exists already as a spare bit in the PBCH payload.

The transmission occurrences of the resources associated with the auxiliary RS may be explicitly indicated for the UE 210. This configuration may be indicated e.g. by using a spare bit in a supported PBCH payload.

For a multiplexing pattern 1 of FIG. 5A, it may happen that a TYPE0 CSS (common search space) of multiple beams is overlapping. This may happen e.g. when there are two monitoring occasions in two consecutive slots for the beam. In this case, the auxiliary RS (such as a CORESET WB DMRS) may be "always on" in the first monitoring location of the TYPE0 CSS.

The network node 200 may indicate a 1-bit payload as a part of the PBCH by using reserved states, or alternatively those can be borrowed/repurposed from existing signaling bits covering non-relevant signaling/information elements. When suitable bit fields of the PBCH are repurposed to indicate the presence of the auxiliary RS and its location, having to specify additional payload bits (which would cause reduced coverage) can be avoided.

To further illustrate the above examples, the Table 1 below shows an example set of resource blocks and slot symbols of a CORESET for a Type0-PDCCH search space set when an {SS/PBCH block, PDCCH} SCS is {240, 120} kHz. The last row of the table may be used to activate the presence of the auxiliary RS.

TABLE 1

| Index | SS/PBCH block and CORESET multiplexing pattern | Number of RBs $N_{RB}^{CORESET}$ | Number of Symbols $N_{symb}^{CORESET}$ | Offset (RBs) | Auxiliary RS |
|---|---|---|---|---|---|
| 0 | 1 | 48 | 1 | 0 | No |
| 1 | 1 | 48 | 1 | 8 | No |
| 2 | 1 | 48 | 2 | 0 | No |
| 3 | 1 | 48 | 2 | 8 | No |
| 4 | 2 | 24 | 1 | −41 if $k_{SSB} = 0$ −42 if $k_{SSB} > 0$ | No |
| 5 | 2 | 24 | 1 | 25 | No |
| 6 | 2 | 48 | 1 | −41 if $k_{SSB} = 0$ −42 if $k_{SSB} > 0$ | No |
| 7 | 2 | 48 | 1 | 49 | |
| 8 | | Reserved | | | |
| 9 | | Reserved | | | |
| 10 | | Reserved | | | |
| 11 | | Reserved | | | |
| 12 | | Same as index 4 | | | Yes |
| 13 | | Same as index 5 | | | Yes |
| 14 | | Same as index 6 | | | Yes |
| 15 | | Same as index 7 | | | Yes |

At least some of the embodiments described herein may allow compensation of residual time-frequency error(s) in communications.

Furthermore, at least some of the embodiments described herein may allow avoiding degradation of a CORESET/PDSCH demodulation in DL and/or UL PUSCH reception caused by high residual timing error(s) in UL. Furthermore, at least some of the embodiments described herein may allow such a type0-PDCCH monitoring occasion design with the SSB multiplexing that makes it possible to use higher numerologies for the CORESET/PDSCH with respect to the SSB. Furthermore, at least some of the embodiments described herein may allow an overall design with different numerology options and signaling mechanisms as well as UE procedures that enables efficient and flexible operation with different/mixed numerology options for the SSB and CORESET/PDSCH for above 52.6 GHz operations.

The functionality described herein can be performed, at least in part, by one or more computer program product components such as software components. According to an embodiment, the network node device 200 and/or client device 210 may comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A network node device, comprising:
   at least one processor; and
   at least one memory including computer program code, the at least one memory and computer program code configured to, with the at least one processor, cause the network node device to perform:
   transmitting, to a client device and prior to establishing an RRC connection with the client device, an auxiliary reference signal indication comprising presence and location information of an auxiliary reference signal in a physical downlink channel transmission; and
   transmitting the auxiliary reference signal associated with a physical downlink channel in accordance with the transmitted auxiliary reference signal indication to the client device,
   wherein one or more resources of the auxiliary reference signal are repeated over K consecutive symbols, or repeated after L symbols over K consecutive or non-consecutive symbols of a first symbol reserved for the type 0 physical downlink control channel.

2. The network node device according to claim 1, wherein the at least one memory and computer program code are further configured to, with the at least one processor, cause the network node device to perform:
   transmitting the auxiliary reference signal indication to the client device prior to transmitting the auxiliary reference signal associated with the physical downlink channel.

3. The network node device according to claim 1, wherein the presence and location information comprises at least one of:
   an explicit presence and/or location indication for inclusion in a master information block carried by a physical broadcast channel, the explicit presence and/or location indication indicating a multiplexing and/or occurrence pattern for the auxiliary reference signal; or
   an implicit presence and/or location indication for inclusion in the master information block carried by the physical broadcast channel, the implicit presence and/or location indication comprising derivation information for deriving the presence and/or location of the auxiliary reference signal of the physical downlink channel transmission.

4. The network node device according to claim 1, wherein the at least one memory and computer program code are further configured to, with the at least one processor, cause the network node device to perform:
   determining a type of the demodulation reference signal of the control resource set #0 from the auxiliary reference signal indication.

5. A method, comprising:
   transmitting, by a network node device to a client device and prior to establishing an RRC connection with the client device, an auxiliary reference signal indication comprising presence and location information of an auxiliary reference signal in a physical downlink channel transmission; and
   transmitting, by the network node device to the client device, the auxiliary reference signal associated with a physical downlink channel in accordance with the transmitted auxiliary reference signal indication to the client device,
   wherein one or more resources of the auxiliary reference signal are repeated over K consecutive symbols, or repeated after L symbols over K consecutive or non-consecutive symbols of a first symbol reserved for the type 0 physical downlink control channel.

6. A client device, comprising:
   at least one processor; and
   at least one memory including computer program code, the at least one memory and computer program code configured to, with the at least one processor, cause the client device to perform:
   receiving, from a network node device and prior to establishing an RRC connection with the network device, an auxiliary reference signal indication comprising presence and location information of an auxiliary reference signal in a physical downlink channel transmission; and
   receiving, from the network node device, the auxiliary reference signal associated with a physical downlink channel in accordance with the auxiliary reference signal indication,
   wherein one or more resources of the auxiliary reference signal are repeated over K consecutive symbols, or repeated after L symbols over K consecutive or non-consecutive symbols of a first symbol reserved for the type 0 physical downlink control channel.

7. The client device according to claim 6, wherein the at least one memory and computer program code are further configured to, with the at least one processor, cause the client device to perform:
   receiving from the network node device the auxiliary reference signal indication prior to receiving the auxiliary reference signal associated with the physical downlink channel.

8. The client device according to claim 7, wherein the at least one memory and computer program code are further configured to, with the at least one processor, cause the client device to perform:
   determining, based on the presence and location information in the received auxiliary reference signal indication, the presence and location of the auxiliary reference signal in a subsequent physical downlink channel transmission.

9. The client device according to claim 6, wherein the presence and location information comprises at least one of:
   an explicit presence and/or location indication included in a master information block carried by a physical broadcast channel, the explicit presence and/or location indication indicating a multiplexing and/or occurrence pattern for the auxiliary reference signal; or
   an implicit presence and/or location indication included in the master information block carried by the physical broadcast channel, the implicit presence and/or location indication comprising derivation information for deriving the presence and/or location of the auxiliary reference signal of the physical downlink channel transmission.

10. The client device according to claim 6, wherein the at least one memory and computer program code are further configured to, with the at least one processor, cause the client device to perform:
    determining the presence information based on a subcarrier spacing ratio between a synchronization signal block and the control resource set #0.

* * * * *